June 14, 1927.  
E. E. BARTELS  
1,632,213  
LIQUID AND MECHANICAL SEAL  
Filed May 12, 1924

Inventor:
Edward E. Bartels,

Patented June 14, 1927.

1,632,213

UNITED STATES PATENT OFFICE.

EDWARD E. BARTELS, OF WHITING, INDIANA, ASSIGNOR TO STANDARD OIL COMPANY, OF WHITING, INDIANA, A CORPORATION OF INDIANA.

LIQUID AND MECHANICAL SEAL.

Application filed May 12, 1924. Serial No. 712,720.

Figure 1:
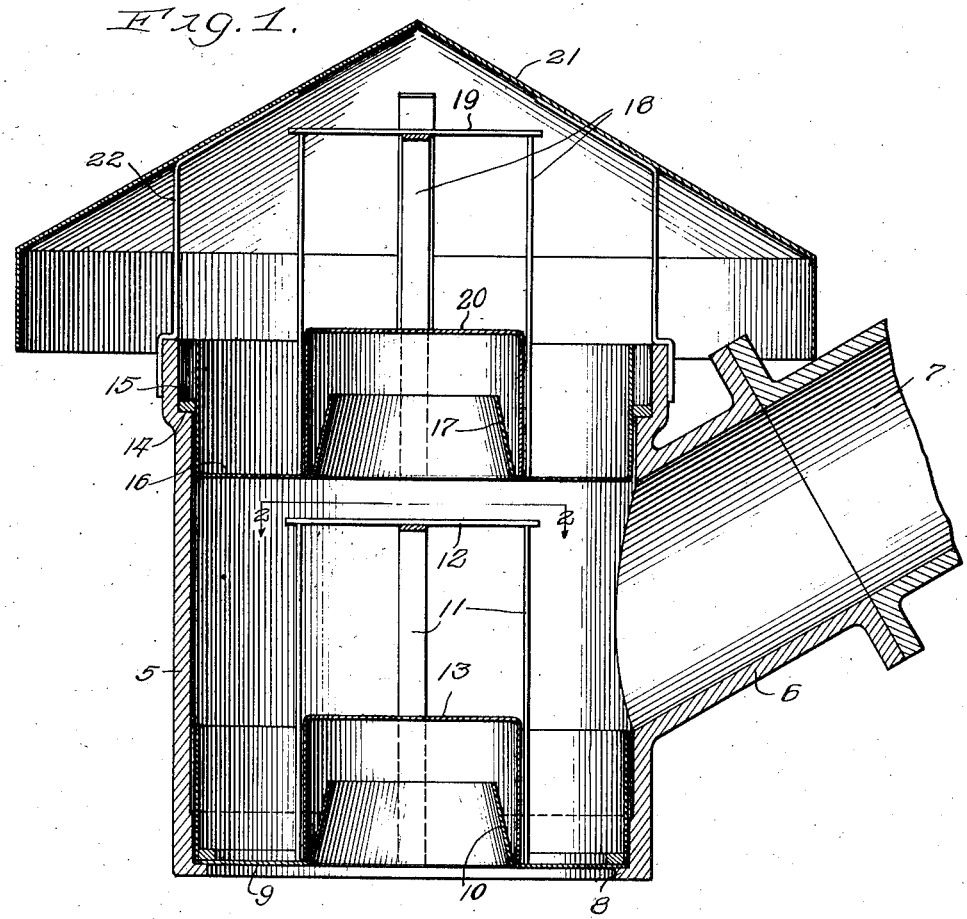
Figure 2:
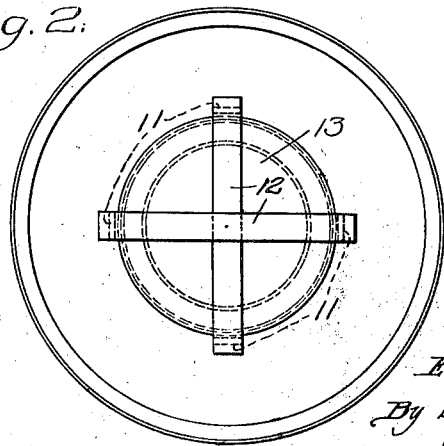

The present invention relates to improvements in liquid and mechanical seals, and will be fully understood from the following description, illustrated by the accompanying drawings, in which:

Figure 1 is a vertical section through a seal construction embodying the present invention; and Fig. 2 is a partial transverse section on the line 2—2 of Fig. 1.

Referring more particularly to the drawings, the numeral 5 indicates a cylindrical casing, suitably formed as a casting, having an opening 6, preferably upwardly inclined, at an intermediate point on its side, the opening 6 being intended for connection, for example, to a vent pipe 7 from the vapor space of a storage tank containing gasoline or other volatile liquids.

At its lower end, the casing 5 is provided with an inwardly directed shoulder or flange 8, upon which rests a pan 9, in the center of which is an opening surrounded by upwardly directed walls 10. The upper surface of the flange 8 may, if desired, be ground to a smooth fit to the bottom of the pan, or if desired, a gasket may be interposed therebetween, so that a substantially gas tight joint is formed.

At suitable points around the center opening 10 of the pan 9, vertical straps or guides 11 are secured to the bottom of the pan, these being connected at their tips by suitable cross pieces 12. The straps 11 serve as guides for an inverted cup 13, which surrounds the center opening 10 of the pan 9, and is freely movable vertically within the guides 11.

The interior diameter of the casing 5 above the shoulder 8 is proportioned to permit the vertical removal of the pan 9. Above the opening 6, the interior wall of the casing 5 is enlarged to form a shoulder 14, upon which rests a ring 15 secured to the outer wall of a second pan 16 similar in form to the pan 9. The pan 16, like the pan 9, has a center walled opening 17 around which are provided vertical straps or guides 18 connected at their tops by cross pieces 19. The inverted cup 20 is guided within the guides 18. The casing is surmounted by a cover member 21, preferably conical in form, which is removably supported upon the casing 5, for example, by the supports 22.

In operation, when a partial vacuum is formed in the vent pipe 7 or in the storage tank with which it communicates, the inverted cup 13 in the lower pan 9 is raised. A level of liquid is maintained within the pan 9 below the top of the inner wall 10 surrounding the central opening; and the weight of the cup 13 and the level of liquid are so controlled that air will be drawn into the casing through the central opening in the pan 9, when the difference in pressure between the external atmosphere and that prevailing within the vent pipe and storage tank exceeds a predetermined amount. When the device is intended to operate under small differences in pressure, the cup 13 is suitably made of very light material, for example, aluminum. When the pressure within the system is lower than the external atmospheric pressure, it will be readily apparent that the cup 20 in the upper pan 16 is held seated within the pan.

When the pressure within the system exceeds the external atmospheric pressure, the inverted cup 13 in the lower pan 9 is forced on its seat, and the cup 20 in the pan 16 is raised until the pressure is released through the liquid in the pan 16.

The construction described is efficient and inexpensive, and permits of ready cleansing of the apparatus. The protecting cover 21 is removed and the pans 16 and 9 with their attached parts, may then be lifted out of the casing 5, cleansed and returned thereto.

I claim:

1. In a liquid and mechanical seal, a cylindrical casing, said casing having an opening intermediate its height, an inturned flange formed on the wall of said casing below said opening, a pan slidable within said casing and seated on said flange, a shoulder formed in the wall of said casing above said opening, said shoulder extending outwardly from said wall, a pan having an external supporting ring seated on said shoulder, each of said pans having a central walled opening, an inverted cup over each of said openings, and guide means for guiding each of said cups in its vertical movement.

2. In a liquid and mechanical seal, a substantially cylindrical casing having an opening intermediate its height, an inwardly directed shoulder below said opening, a shoulder formed in the wall of the casing above said opening, and sheet metal pans seated on said shoulders, each of said pans having a central walled opening, an inverted cup over each of said openings, and means for guiding the vertical movement of said cups.

3. In a liquid and mechanical seal; a substantially cylindrical casing having an opening intermediate its height; a readily removable sheet metal pan closing the upper end of said casing, said pan having a central walled opening, and adapted to contain a liquid; an inverted cup over said central walled opening in said pan; and a liquid seal closing the lower end of said casing.

4. In a liquid and mechanical seal; a substantially cylindrical casing having an opening intermediate its height; a readily removable sheet metal pan closing the upper end of said casing, said pan having a central walled opening and adapted to contain liquid; a readily removable sheet metal pan closing the lower end of said casing, said pan having a central walled opening and adapted to contain a liquid; and an inverted cup in each of said pans over its central walled opening.

5. In a liquid and mechanical seal; a substantially cylindrical casing having an opening intermediate its height; a readily removable sheet metal pan closing the upper end of said casing, said pan having a central walled opening, and adapted to contain a liquid; an inverted cup over said central walled opening in said pan; a liquid seal closing the lower end of said casing; and means for guiding the vertical movement of said cup.

6. In a liquid and mechanical seal; a substantially cylindrical casing having an opening intermediate its height; a readily removable sheet metal pan closing the upper end of said casing, said pan having a central walled opening and adapted to contain liquid; a readily removable sheet metal pan closing the lower end of said casing, said pan having a central walled opening and adapted to contain a liquid; an inverted cup in each of said pans over its central walled opening; and means for guiding the vertical movement of said cups.

7. In a liquid and mechanical seal; a substantially cylindrical casing having an opening intermediate its height; a readily removable sheet metal pan closing the upper end of said casing, and having a liquid sealed opening therein; and a readily removable sheet metal pan closing the lower end of said casing, said pan having a liquid sealed opening therein.

8. In a liquid and mechanical seal; a substantially cylindrical casing having an opening intermediate its height adapted for attachment to the vapor space of a liquid storage tank, the upper and lower ends of said casing being open to the atmosphere; a pan arranged in said casing above said opening; and a pan arranged in said casing below said opening; each of said pans being provided with an opening having a wall surrounding the same, and a cup over said wall, the opening formed between said wall and said cup being liquid sealed.

EDWARD E. BARTELS.